United States Patent [19]

Chisvette et al.

[11] Patent Number: 4,522,654

[45] Date of Patent: Jun. 11, 1985

[54] CONTINUOUS METHOD OF PRODUCING PHTHALOCYANINE PIGMENT DISPERSIONS IN ORGANIC SOLVENT

[75] Inventors: Dominick Chisvette, Colonia; James Lattimore, Paterson; Stanley G. Sova, Clifton, all of N.J.

[73] Assignee: Inmont Corporation, Clifton, N.J.

[21] Appl. No.: 564,666

[22] Filed: Dec. 23, 1983

[51] Int. Cl.$^3$ .................... C08K 5/34; C09D 11/00; C07D 207/00
[52] U.S. Cl. .................... 106/288 Q; 106/308 N; 106/309; 106/20; 106/22; 106/308 Q; 524/88
[58] Field of Search .............. 106/288 Q, 308 N, 309, 106/20, 22, 308 Q; 524/88

[56] References Cited

U.S. PATENT DOCUMENTS 3,775,149  11/1973  Langley et al. ............ 106/308 Q
4,227,810  1/1984  Chisvette et al. ................ 524/88

*Primary Examiner*—John Kight
*Assistant Examiner*—Marvin L. Moore
*Attorney, Agent, or Firm*—M. R. Chipaloski; E. R. Skula

[57] ABSTRACT

A continuous method for producing a dispersion of phthalocyanine blue pigment in an organic solvent is disclosed. The method involves the following two steps:

(A) mixing a phthalocyanine crude pigment at about 10 to 50% by weight with from about 5 to 20% by weight of surfactant in a binder containing an organic solvent, and (B) continuously pumping the blend of (A) through at least two shot mills in series in which the shot grinding media range in size from 0.1 to 2.5 mm. diameter and grinding the blend until the particle size of the crude is reduced to where the solvent dispersion has suitable pigment tinctorial strength for use in inks and coatings.

The dispersion of blue pigment produced by this method is especially useful in paste inks and organic solvent-based coatings.

10 Claims, No Drawings

CONTINUOUS METHOD OF PRODUCING PHTHALOCYANINE PIGMENT DISPERSIONS IN ORGANIC SOLVENT

BACKGROUND OF THE INVENTION

1. Field of the Invention

This invention relates to a continuous process for the manufacture of phthalocyanine pigment dispersions of primarily beta crystal structure and more particularly to a continuous process for the manufacture of phthalocyanine blue pigment in a binder containing an organic solvent. The phthalocyanine blue pigment dispersion may be used in paste printing inks and solvent-based inks and coatings.

2. Description of the Prior Art

The manufacture of phthalocyanine pigment crude usually results in the formation of a product containing impurities of relatively large crystal size, and has been referred to in the art as phthalo crude. This crude requires some form of particle size reduction and/or purification to be useful as a pigment having the tinctorial strength and intensity necessary for use in compositions such as printing inks and coatings.

Various methods have been proposed by the prior art to reduce the particle size and improve the purity of the phthalo crude.

The use of an aqueous medium for milling phthalo crude is disclosed in U.S. Pat. No. 2,999,862. U.S. Pat. No. 3,775,149 relates to the preparation of phthalocyanine pigments and is specifically concerned with the milling of phthalo crude in aqueous suspension, in the presence of a surfactant, to give a filterable paste of phthalocyanine which is predominantly of the beta-pigment form. This method, however, results in flocculated product where the pigment is purified when recovered as a presscake or in dry form. Thus, flocculation of the pigment has been a desirable feature according to these prior art processes and has provided a means for purifying the pigment. However, the resultant presscake or dry form of the pigment must then be redispersed for use in products such as inks, coatings and paints, etc.

In related co-pending U.S. application Ser. No. 033,362 filed Apr. 26, 1979, now U.S. Pat. No. 4,427,810 a continuous method of producing an aqueous phthalocyanine pigment dispersion is described in detail.

We have now found that beta-phthalocyanine pigment can be produced by a continuous method in a binder containing an organic solvent that can then be used directly in solvent-based products such as oil-based paste inks and organic coatings. The pigment dispersion in organic solvent according to the invention thus eliminates two steps in the use of phthalo blue pigment, i.e., filtering flocculated pigment and redispersion for an end use.

SUMMARY OF THE INVENTION

The present invention relates to a two-step continuous method of converting crude phthalocyanine to a dispersed form in organic solvent which is useful in oil-based paste inks and organic coatings, said method comprising:

(A) premixing phthalo crude with from about 5 to about 20% by weight of surfactant, based on pigment, and an amount of a binder (containing an organic solvent) sufficient to reduce the crude concentration to 10 to 50% by weight, based on the total mixture, said premixing being accomplished by agitation to break loose and wet agglomerates and obtain a uniform blend of the ingredients without appreciably reducing the particle size of the crude and (B) continuously pumping the blend of (A) through at least one but preferably two shot mills in series containing between 50 and 90% by volume of a grinding media that has a size in the range of from about 0.1 to 2.5 mm. diameter at such rate as to reduce the crude to the size where the pigment dispersion has suitable tinctorial strength for use in inks and coatings.

DETAILED DESCRIPTION OF THE INVENTION

The present invention provides a continuous method of producing phthalocyanine blue pigment dispersion in an organic solvent. The method comprises (A) premixing phthalo crude with from about 5 to 20% by weight of surfactant based on pigment and an amount of binder containing an organic solvent sufficient to reduce the crude concentration to 10 to 50% by weight, based on the total mixture, said premixing being accomplished by agitation to break down loose crude agglomerates and obtain a uniform blend of the crude without appreciably reducing the particle size of the crude, and (B) continuously pumping the blend of (A) through one but preferably two shot mills in series containing between 50 and 90% by volume of a grinding media that has a size of from about 0.1 to 2.5 mm. diameter and then grinding at such rate as to reduce the particle size of the crude to pigment particle size.

By phthalo crude we mean phthalocyanine crude pigments obtained commercially by various syntheses and include the copper-, cobalt-, zinc-, nickel-, and cadmium-phthalocyanines as well as metal-free phthalocyanine. Especially preferred is copper phthalocyanine because of its known commercial value in inks and coatings. The phthalo crude typically has a particle size wherein at least 80% of the crude particles have a size greater than 1 micrometer. After conversion of the crude according to the method of this invention, it has been found that at least 95% of the pigment particles have a size less than 1 micrometer, and this size is referred to herein as pigment particle size. The particle size measurements are conveniently made by using a Sedigraph 500 Particle Size Analyzer. By pigment particle size we mean such particle size (of the processed crude) where its dispersion has the tinctorial strength suitable for use in inks and coatings.

Tinctorial strength is conveniently measured by comparing the color of one pigment (the batch), mixed with a specified amount of white base, with the color of another pigment (the standard) mixed with an equal amount of the same white base. The amounts of standard and batch pigments are the same in the two tints, but they will appear to be different if there is a difference in their particle size and therefore in strength. If the color of the batch tint appears to have been produced by a larger amount of pigment than the color of the standard tint, the batch is considered to be stronger than the standard. Utilizing such procedures, it has been found that the tinctorial strength of the unground crude is very low or essentially almost zero whereas that of the pigment crude dispersion according to this invention is much higher (on the order of 100 times) than that of the original crude.

In a preferred embodiment, the present invention relates to a method of converting a crude copper phthalocyanine pigment having at least 80% of the particle sizes of greater than 1 micrometer to a dispersed form which is useful in inks and coatings, said method comprising (A) premixing crude pigment, with 5 to 20%, by weight, of surfactant and an amount of a binder containing an organic solvent sufficient to reduce the pigment concentration to 10 to 50%, by weight, based on total mixture, said premixing being accomplished by agitation to break down loose pigment agglomerates and obtain a uniform blend of the ingredients without appreciably reducing the particle size of the pigment, and (B) continuously pumping the blend of (A) through at least one but preferably two shot mills in series containing between 50 and 90% by volume of a grinding media that has a particle size in the range of 0.1 to 2.5 mm. diameter and then grinding it at such rate as to produce the dispersion with suitable tinctorial strength for use in hnks and coatings.

The surfactants useful in the present method include solid surfactants as well as solvent-soluble, non-ionic and cationic solution types. However, only certain compounds in each class will be effective dispersants. In order to be effective a surfactant according to this invention must meet the following (A) The concentration of the surfactant relative to the crude pigment must be such that the total surface of the ground crude is covered in a monomolecular layer by the surfactant and (B) The surfactant must be soluble in a solvent only up to the required concentration level, in other words partly soluble.

The solid surfactants useful according to this invention can generaly be described as fatty acid amine salts of sulfonated phthalocyanine blue.

| Trade Name | Chemical Name |
|---|---|
| (a) Toyo 103 | Fatty Acid Amine Salt of Sulfonated Phthalo Blue |
| (b) Solsperse 5000 | Fatty Acid Amine Salt of Sulfonated Phthalo Blue |
| (c) Inmont 2741 | Fatty Acid Amine Salt of Sulfonated Phthalo Blue |
| (d) BT 417D | Sulfonated Phthalo Blue |

The non-ionic surfactants can generally be described as ethylene oxide adducts, the cationic surfactants as quaternary ammonium salts and amines, and the anionic surfactants as acid salts.

Specific solution-type surfactants that have been found suitable include the following:

| Surfactant Type | | |
|---|---|---|
| I. Non-Ionic | (a) Triton X15 | Octyl phenoxy polyethoxyethanol |
| II. Cationic | (a) Ethomeen 0–12 | Polyoxyethylene oleylamine |

Typical useful surfactant concentration levels have been found to be from about 5 to 20% by weight based on the crude phthalocyanine. This concentration level of surfactant is a crtical aspect of the invention and has been found to result in a shorter grinding time or faster throughput through the mills as well as the grinding of crude to a much smaller particle size without flocculation of the pigment in the final diluted compositions. It is very important that flocculation not take place according to the present dispersion method of pigment production and the surfactant selection and concentration are therefore critical aspects of the present method.

The process according to the invention is preferably run at a temperature from about 5° to 80° C. and will work perfectly adequately at room temperature. In fact, however, all grinding operations result in generation of heat, so that cooling may be necessary if the mix is to be kept at ambient temperature. The temperature may be allowed to rise somewhat, for example to 80° C., so as to save expense of cooling, without detrimental effect, but we prefer that the temperature of grinding should not in any case rise above 90° C.

The wetting (premixing) of the crude (Step A) in the present method may be accomplished in any type mixing vessel or shot mill. The blend is agitated to produce a homogeneous composition. Preferably, the blend is then pumped through at least one but preferably two pressurized shot mills capable of retaining grinding media made from glass, steel, ceramics, etc., in the size range of from 0.1 to 2.5 mm. diameter. The rate at which the blend is fed into 25 liter shot mills can be varied between 50 and 1000 lb/hr and most preferably in the range of 100 to 250 lb/hour. Rates will vary with shot mill size. The blend is passed through at least two shot mills to achieve the tinctorial color value of pigment suitable for commercial use. However, it will be appreciated that the residence time in the shot mills will determine the particle size of the pigment but one, or more than two shot mills, can also be used in the grinding step. It has been found that the use of at least two shot mills provides the optimum conditions of time and power usage for the formation of pigment dispersion having the tinctorial color value desired in commercial use.

The pigment dispersions prepared in accordance with the present invention may be used for coloring a variety of solvent and oil-based inks and coatings.

Typically, inks prepared in accordance with this invention contain a pigment that is dispersed in a resin solution. The inks may contain other conventional ink ingredients. For instance, ethyl cellulose, wax compounds, pigment wetting agents, reactive hydrocarbon resins, etc., may be added for their known effects.

The invention will next be illustrated in terms of specific examples. In these examples, as well as in the other parts of the present applicaiton, all amounts and proportions are expressed as parts by weight unless otherwise indicated.

DESCRIPTION OF THE PREFERRED EMBODIMENTS

Throughout this specification all parts are to be understood as parts by weight.

The invention is illustrated by the following examples.

EXAMPLE 1

Preparation of Solvent-Based Phthalo Blue Dispersion By 100 Hours Milling in a Jar Mill

| | |
|---|---|
| Crude Cu—Phthalo Blue - Toyo #4 | 15.0 |
| Sulfonated Phthalocyanine Derivative | 0.6 |
| Resin Binder (zincated rosin) | 21.9 |
| Triton X-15 octylphenoxypolyethoxyethanol | 0.3 |
| Solvent (lactol spirits) | 112.2 |

| | |
|---|---|
| 0.75 mm. glass beads | 200.0 |

The resulting dispersion of the phthalo blue pigment was found to possess equal color strength to the standard pigment when made into publication gravure ink.

EXAMPLE 2

The following materials were added to a 150 gallon tank:

| | |
|---|---|
| Crude Cu—Phthalo Blue - Toyo #4 | 19.0 |
| Sulfonated Phthalocyanine Derivative (2741) | 1.0 |
| Resin Binder (zincated rosin) | 33.0 |
| Solvent (lactol spirits) | 47.0 |

These materials were blended in the tank until a homogeneous mixture was obtained. The mixture was then milled in a 25 liter Drais Horizontal disk mill at the rate of 150 lbs/hr per pass for a total of three passes. The mill contained 85% by volume of carbon steel shot of 0.25 mm. diameter. The resulting dispersion of the phthalo blue pigment was found to possess superior blue color properties compared to standard dispersions and was used directly in a publication gravure ink formulation without flocculation.

EXAMPLE 3

The procedure of Example 2 was followed except the following materials were added to a 150 gallon tank:

| | |
|---|---|
| Crude Cu—phthalo blue - Toyo #4 | 20.0 |
| Lecithin | 2.0 |
| Lactol spirits | 78.0 |

When the grinding was completed (@1500 lbs/hr rate) in this instance the pigment flocculated in a publication gravure ink formulation, and was therefore not useful as a pigment dispersion.

EXAMPLE 4

The procedure in Example 2 was followed with the following materials added to a 150 gallon tank:

| | |
|---|---|
| Crude Cu—phthalo Blue Toyo #4 | 16.0 |
| Sulfonated Phthalocyanine Derivative (Toyo 103) | 0.8 |
| Treated Phthalo blue pigment (DuPont BT 4171) | 1.2 |
| Bis (2-hydroxyethyl) oleylamine (Ethomeen 0/12) | 0.2 |
| Resin Binder (Zincated Rosin) | 32.1 |
| Solvent (lactol spirits) | 49.7 |

The materials were blended in the tank until a homogeneous mixture was obtained. The mixture was then milled in a Drais Horizontal Disk mill (at the rate of 95–150 lbs/hr/per pass) for a total of two passes. The mill contained 85% steel shot of 0.25 mm. diameter. The resulting dispersion of the phthalo blue pigment was found to possess superior blue color properties and was used directly in a publication gravure ink formulation.

EXAMPLE 5

The following materials were added to a 10 gallon tank:

| | |
|---|---|
| Crude Cu—Phthalo Blue Toyo #4 | 34.0 |
| Sulfonated phthalocyanine derivative (Solsperse 5000) | 1.7 |
| Solsperse 3000 (Proprietary) | 2.0 |
| Maleic modified PE ester of rosin (Pentalyn G) | 5.88 |
| Alkyd (K882) | 5.88 |
| Hydrocarbon solvent 470 oil | 8.69 |
| Tridecyl alcohol | 1.4 |
| Antioxidant (Ionol - Shell) | 0.15 |
| Solvent - lactol spirits | 40.3 |

The materials were blended in the tank until a homogeneous mixture was obtained. The mixture was then milled in a 4 liter Netzsch Horizontal disk shot mill at the rate of 20 lbs per hour per pass for a total of three passes. The mill contained 90% by volume of steel shot of 0.45 mm. diameter. This dispersion was used directly in publication gravure ink.

EXAMPLE 6

Example 5 was repeated except lactol spirits was replaced with Hydrocarbon solvent 470 Magie Oil. This dispersion was used in oil based inks for letterpress and heatset web offset printing.

We claim:

1. The method of converting a phthalocyanine crude wherein at least 80% of the crude particles have a size greater than 1 micrometer to a dispersed form which is useful in inks and coatings, said method comprising
   (A) premixing phthalo crude at about 10 to 50% by weight with from about 5 to 20% by weight of surfactant based on pigment in a binder containing an organic solvent, said premixing being accomplished by agitation to break down loose crude agglomerates and obtain a uniform blend of the crude without appreciably reducing the particle size of the crude, and
   (B) continuously pumping the blend of (A) through at least one but preferably two shot mills containing between 50 and 90% by volume of a grinding media that has a size of from about 0.1 to 2.5 mm. diameter and then grinding at such rate that the particle size has been reduced to pigment particle size.

2. The method of claim 1 in which the grinding in the shot mill is carried out at a temperature of 5 to 80° C.

3. The method of claim 1 in which the surfactant is a solvent-soluble non-ionic surfactant.

4. The method of claim 3 in which the solvent-soluble non-ionic surfactant is an ethylene oxide adduct.

5. The method of claim 1 in which the surfactant is a solvent-soluble cationic surfactant.

6. The method of claim 1 in which the surfactant is solid surfactant.

7. The method of claim 1 wherein the crude phthalocyanine pigment is selected from copper, cobalt, zinc, nickel, cadmium and metal-free phthalocyanine.

8. The method of converting a crude copper phthalocyanine pigment wherein at least 80% of the crude has a size greater than 1 micrometer to a dispersed form which is useful in inks and coatings, said method comprising
   (A) premixing crude pigment, with 5 to 20% by weight of surfactant in a binder containing an organic solvent, said premixing being accomplished by agitation to break down loose pigment agglomerates and obtain a uniform blend of the ingredients without appreciably reducing the particle size of the pigment, and
(B) continuously pumping the blend of (A) through at least two shot mills containing between 50 and 90% by volume of a grinding media that has a size in the range of 0.1 to 2.5 mm. diameter, and then grinding until the dispersion has suitabletinctorial strength for use in inks and coatings.

9. A dispersion for solvent based ink comprising copper phthalocyanine blue pigment dispersed in a solution of binder resin. and organic solvent wherein the pigment is dispersed by the method of claim 8.

10. A dispersion for paste ink comprising copper phthalocyanine blue pigment dispersed in a solution of binder resin and organic solvent wherein the pigment is dispersed by the method of claim 8.

* * * * *